United States Patent
Fluman et al.

(10) Patent No.: US 9,703,340 B1
(45) Date of Patent: Jul. 11, 2017

(54) INTERMITTENTLY REDISTRIBUTING ENERGY FROM MULTIPLE POWER GRIDS IN A DATA CENTER CONTEXT

(71) Applicant: International Business Machines Corporation, Armonk, NY (US)

(72) Inventors: Mudi M. Fluman, Haifa (IL); Yaacov Frank, Houston, TX (US); Igor Nabutovsky, Beit-Shemesh (IL); Yehuda Shiran, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/973,810

(22) Filed: Dec. 18, 2015

(51) Int. Cl.
*G06F 1/32* (2006.01)
*G06F 1/26* (2006.01)

(52) U.S. Cl.
CPC . *G06F 1/26* (2013.01); *G06F 1/32* (2013.01)

(58) Field of Classification Search
CPC .................................... G06F 1/26; G06F 1/32
See application file for complete search history.

(56) References Cited

U.S. PATENT DOCUMENTS

| 7,646,109 | B2 | 1/2010 | Belady et al. |
| 8,907,520 | B2 | 12/2014 | Chapel et al. |
| 9,426,320 | B1* | 8/2016 | Il ........................ H04N 1/00907 |
| 2002/0143593 | A1* | 10/2002 | Takata ............. G06Q 10/06315 705/7.25 |
| 2003/0193405 | A1* | 10/2003 | Hunt ...................... G01D 4/004 340/870.02 |
| 2009/0326728 | A1* | 12/2009 | Chrisop ................ G06F 1/3203 700/295 |

(Continued)

FOREIGN PATENT DOCUMENTS

| CN | 102930393 A | 2/2013 |
| CN | 203574373 U | 4/2014 |

OTHER PUBLICATIONS

Baliga et al., "Green Cloud Computing: Balancing Energy in Processing, Storage, and Transport", Proceedings of the IEEE, vol. 99, No. 1, Jan. 2011, © 2010, IEEE, Date of publication Aug. 30, 2010, date of current version Dec. 17, 2010, pp. 149-167.

(Continued)

*Primary Examiner* — Phil Nguyen
(74) *Attorney, Agent, or Firm* — David B. Woycechowsky (57) ABSTRACT

A technique for using machine logic to configure power supply units in a data center including: (i) receiving cost information for multiple power grids that includes expected cost information for a time period; (ii) receiving usage information for multiple data center loads in a data center that includes expected electrical power usage for the data center loads; (iii) determining a target power information set, based, at least in part, on the cost information and the usage information, with the target power information set, for the time period, including a target power amount respectively corresponding to each power grid; and (iv) determining a power supply unit configuration scheme so that, when operating under the power supply unit configuration scheme, each power grid will supply, at least approximately, its respectively corresponding target power amount.

10 Claims, 5 Drawing Sheets

(56) References Cited

U.S. PATENT DOCUMENTS

| | | | | |
|---|---|---|---|---|
| 2010/0070091 | A1* | 3/2010 | Watson | G06Q 50/06 |
| | | | | 700/278 |
| 2010/0211810 | A1 | 8/2010 | Zacho | |
| 2010/0321574 | A1* | 12/2010 | Kerofsky | G06Q 50/06 |
| | | | | 348/563 |
| 2011/0289329 | A1* | 11/2011 | Bose | G06F 1/329 |
| | | | | 713/320 |
| 2012/0016528 | A1* | 1/2012 | Raman | G06F 9/5094 |
| | | | | 700/291 |
| 2013/0321136 | A1* | 12/2013 | Park | D06F 33/02 |
| | | | | 340/12.54 |
| 2014/0039965 | A1* | 2/2014 | Steven | G06Q 10/06315 |
| | | | | 705/7.25 |
| 2015/0214737 | A1* | 7/2015 | Ichino | G05B 15/02 |
| | | | | 700/297 |
| 2015/0253795 | A1* | 9/2015 | Saito | G06Q 50/06 |
| | | | | 700/291 |

OTHER PUBLICATIONS

Fluman et al., "Unbalanced Load Sharing With Parallel Power Supplies", U.S. Appl. No. 14/755,460, filed Jun. 30, 2015.

Kant et al., "Willow: A Control System for Energy and Thermal Adaptive Computing", 2011 IEEE International Parallel & Distributed Processing Symposium, DOI 10.1109/IPDPS.2011.14, pp. 36-47.

"A system and method to reduce network power and equipment costs in cloud based datacenters", An IP.com Prior Art Database Technical Disclosure, Authors et. al.: Disclosed Anonymously, IP.com No. 000207905, IP.com Electronic Publication: Jun. 16, 2011, pp. 1-4.

* cited by examiner

| SECOND BALANCING ITERATION TABLE ||||||||||
| ENCLOSURE | TOTAL POWER | BEFORE OFFLOAD FROM GRID c TO GRID a ||| OFFLOAD 250w FROM GRID c TO GRID a ||| AFTER OFFLOAD FROM GRID c TO GRID a |||
| | | GRID a | GRID b | GRID c | GRID a | GRID b | GRID c | GRID a | GRID b | GRID c |
| 4ac1 | 100 | 50 | | 50 | 17 | | -17 | 67 | | 33 |
| 4ac2 | 200 | 100 | | 100 | 33 | | -33 | 133 | | 67 |
| 4ac3 | 300 | 150 | | 150 | 50 | | -50 | 200 | | 100 |
| 4ac4 | 400 | 200 | | 200 | 67 | | -67 | 267 | | 133 |
| 4ac5 | 500 | 250 | | 250 | 83 | | -83 | 333 | | 167 |
| 4ab1 | 600 | 300 | 300 | | | | | 300 | 300 | |
| 4ab2 | 700 | 350 | 350 | | | | | 350 | 350 | |
| 4ab3 | 700 | 350 | 350 | | | | | 350 | 350 | |
| 4bc1 | 1000 | | 909 | 91 | | | | | 909 | 91 |
| 4bc2 | 1200 | | 1091 | 109 | | | | | 1091 | 109 |
| Total | 5700 | 1750 | 3000 | 950 | 250 | | -250 | 2000 | 3000 | 700 |

| ENCLOSURE | TOTAL POWER | BEFORE OFFLOAD FROM GRID c TO a AND b | | | OFFLOAD 1150w FROM GRID c TO a AND b | | | AFTER OFFLOAD FROM GRID c TO a AND b | | |
|---|---|---|---|---|---|---|---|---|---|---|
| | | GRID a | GRID b | GRID c | GRID a | GRID b | GRID c | GRID a | GRID b | GRID c |
| 4ac1 | 100 | 50 | | 50 | 17 | | -17 | 67 | | 33 |
| 4ac2 | 200 | 100 | | 100 | 33 | | -33 | 133 | | 67 |
| 4ac3 | 300 | 150 | | 150 | 50 | | -50 | 200 | | 100 |
| 4ac4 | 400 | 200 | | 200 | 67 | | -67 | 267 | | 133 |
| 4ac5 | 500 | 250 | | 250 | 83 | | -83 | 333 | | 167 |
| 4ab1 | 600 | 300 | 300 | | | | | 300 | 300 | |
| 4ab2 | 700 | 350 | 350 | | | | | 350 | 350 | |
| 4ab3 | 700 | 350 | 350 | | | | | 350 | 350 | |
| 4bc1 | 1000 | | 500 | 500 | | 409 | -409 | | 909 | 91 |
| 4bc2 | 1200 | | 600 | 600 | | 491 | -491 | | 1091 | 109 |
| Total | 5700 | 1750 | 2100 | 1850 | 250 | 900 | -1150 | 2000 | 3000 | 700 |

FULLY BALANCED TABLE 742  744  746  752  754  756  762  764  766

INTERMITTENTLY REDISTRIBUTING ENERGY FROM MULTIPLE POWER GRIDS IN A DATA CENTER CONTEXT

BACKGROUND

The present invention relates generally to the field of power distribution to electrical energy consuming loads (typically servers, sometimes herein referred to as "power consuming loads") in a data center that is supplied by electrical energy sources respectively coming from multiple power grids. As used herein, "grid" is used synonymously with "electrical energy source" (sometimes also referred to herein as "electrical power source," or, more simply as "power source").

A data center typically hosts multiple energy consuming loads, herein generically referred to as "data center loads" or enclosures. For redundancy purposes, each data center load is conventionally electrically connected to two different power grids through two respective power supply units. Because two power supply units power the data center load, the data center load gets only a portion of its electrical power from each grid. Typically, the enclosures are mounted on a rack. The rack has built in electronics to help get electrical power from the power supply to the enclosures in the rack.

SUMMARY

According to an aspect of the present invention, there is a method, computer program product and/or system that performs the following operations (not necessarily in the following order): (i) receiving a plurality of cost information data sets, with each cost information data set respectively corresponding to a power grid of a plurality of power grids and including expected cost information for electrical power drawn from the corresponding power grid during a time period; (ii) receiving a plurality of usage information data sets, with each usage information data set respectively corresponding to a data center load of a plurality of data center loads in a data center and including expected usage information for electrical power expected to be drawn by a corresponding data center load during the time period; (iii) determining a target power information set, based, at least in part, on the plurality of cost information data sets and the plurality of usage information data sets, with the target power information set, for the time period, including a target power amount respectively corresponding to each power grid; and (iv) determining a power supply unit configuration scheme so that, when operating under the power supply unit configuration scheme, each power grid of the plurality of power grids will supply, at least approximately, its respectively corresponding target power amount.

DETAILED DESCRIPTION

Some embodiments of the present invention are directed to techniques for using machine logic to configure power supply units in a data center including: (i) receiving cost information for multiple power grids that includes expected cost information for a time period; (ii) receiving usage information for multiple data center loads that includes expected electrical power usage for the data center loads; (iii) determining a target power information set, based, at least in part, on the cost information and the usage information, with the target power information set, for the time period, including a target power amount respectively corresponding to each power grid; and (iv) determining a power supply unit configuration scheme so that, when operating under the power supply unit configuration scheme, each power grid will supply, at least approximately, its respectively corresponding target power amount. In some embodiments, the cost per unit of energy for at least one power grid varies depending upon the amount of power drawn from that grid. In some embodiments, the configuration is determined by "offloading" power from grids that can only supply limited power in a cost-efficient manner to other grids.

Some embodiments of the present disclosure include one, or more, of the following characteristics, feature and/or advantages: (i) reduce the cost of electrical energy consumed by a data center (which is typically a significant expense in operating a data center); (ii) take into account the fact that the cost of electrical energy may differ (on a static or dynamic basis) between different electrical energy sources respectively supplied by different electrical energy grids; (iii) take into account the fact that the cost differences between electrical energy sources may be due, at least in part, to the type of grid (for example, oil powered grid, hydroelectric powered grid, nuclear powered grid, solar powered grid, coal powered grid, natural gas powered grid, etc.), and/or to the cost of electrical energy transport from the ultimate energy source of the grid to the data center (due to factors such as distance from a power plant to a data center); (iv) take into account the fact that the cost differences between electrical energy sources may also be affected by other factors (for example, factors that cause an electrical energy source's cost to fluctuate dynamically over time); and/or (v) provide a method to balance multiple energy sources respectively associated with multiple grids.

Further with respect to item (iv) in the list of the previous paragraph, the relative costs of energy from the various electrical energy may change over time. For example: (i) during nighttime hours it may be least expensive to consume electrical energy from a grid powered by oil because the competing energy demands on the oil-powered grid are relatively low; while (ii) during the daytime hours it may be least expensive to consume electrical energy from a grid powered by solar power because immediate consumption of energy derived from the sun's radiation reduces, or avoids, costs associated with storage of electrical power in batteries of the solar powered grid.

Some embodiments of this disclosure are based on a certain power supply methodology as follows: (i) each enclosure is supplied with electrical energy from two redundant Power Supply Units (PSUs); (ii) redundancy here is met by two conditions: (a) each of the two PSUs of each enclosure can supply 100% of the electrical energy expected to be needed by the enclosure at any given time, and (b) each of the two PSUs that supplies electrical energy to a given enclosure receives its electrical energy from a different electrical energy source (that is, a different grid); and (iii)

because each of the PSUs supplying a given enclosure can supply all of the electrical energy a given enclosure is expected to need, the two PSUs share the load when both PSUs are in operation.

In some embodiments of the present inventions, a power supply hardware set (PSHS) includes two power supply units (PSUs). A PSU receives power from a power grid and distributes the power to at least one power consuming load. In these embodiments, the two PSUs each receive power from a different power grid, and the power grids are independent of each other with respect to the origin of the power and/or the distribution infrastructure over which the power is delivered to each of the PSUs supplying the data center load.

Some embodiments of the present invention cost-optimize a balance among power source grids that supply power to a data center load (that is, a set of electrically powered components powered by a common set of power supply units).

In a power supply methodology, according to some embodiments of the present invention, redundancy requirements are as follows: (i) each data center load receives power from more than one PSU; (ii) each PSU powering a given data center load, must be able to supply all of the expected power load for the entire data center load; and (iii) each PSU, powering a given data center load, is connected to a different power source corresponding to a different power grid. In some embodiments of the present invention, machine logic selects what fraction of the total power supplied to a data center load is to come from each power grid (that is, during normal operating conditions over a given time period when no power sources have failed). These fractions are herein called the "power source distribution" (or "power grid distribution") for a data center load. In some embodiments, the machine logic will intermittently change the distribution (for example, change the distribution at hourly intervals). In some embodiments, the power grid distribution will be determined by machine logic based on cost considerations so that setting and resetting the power grid distribution will reduce costs. Although it is possible that cost considerations will occasionally cause the power supply for a data center load to be split evenly between two grids, the power supply distribution for a given data center load will usually be a split other than an even split.

In some embodiments of the present disclosure: (i) each set of multiple PSUs share the load in supplying the respectively corresponding data center load when the PSUs are in operation; (ii) presented as a percentage of the full load for the enclosure, the power level of each PSU can be set to any value between 0% and 100% (as opposed to some conventional systems where, by default, each PSU supplies 50% of the load of the respectively corresponding enclosure); and/or (iii) a set of machine logic based rules determine the proportion of required power, provided by each PSU of a set of PSUs, to its respectively corresponding enclosure.

Some embodiments of the present invention may include one, or more, of the following features, characteristics and/or advantages: (i) continuously balances multiple power grids connected to a single system; (ii) proportionally divides the surplus of a first grid among all relevant enclosures; (iii) moves the individual surplus amounts to at least a second grid and/or a third grid, the second and third grids in deficit; and/or (iv) once one of these three grids is balanced, the method is repeated to balance the remaining unbalanced grids.

Above, in this Detailed Description section, an example method was presented for adjusting grid distribution, based on cost considerations, for a single data center load. Discussion will now proceed to embodiments of the present invention where grid distribution is determined, again, based on cost considerations, for multiple data center loads in a data center having three (or more) grid sources available to the data center considered as a whole. In the embodiments discussed below, each data center load has only two grid sources, but it will be understood by those of skill in the art that some embodiments of the present invention could be directed to a data center where some of the data center load(s) subject to grid distribution under the present invention may have three or more grid sources.

Figure 1:
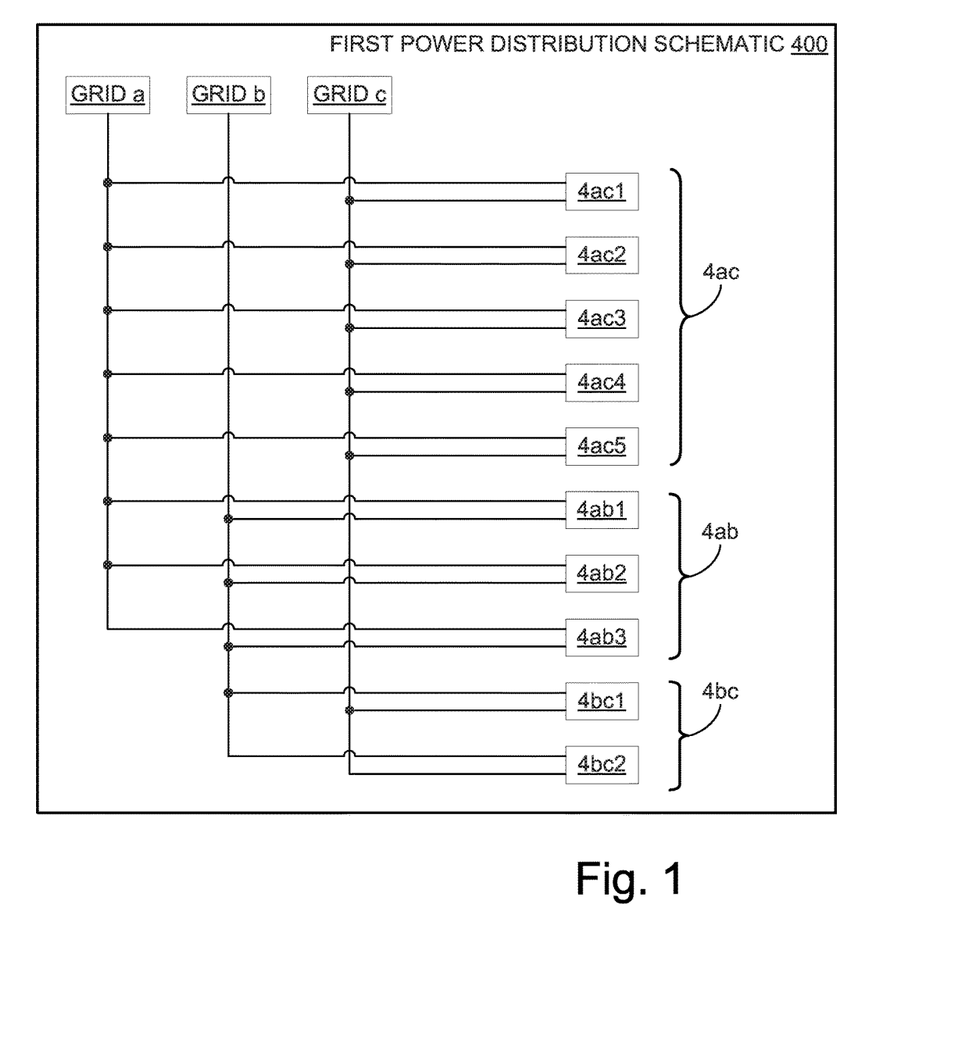
FIG. 1 is a schematic view of a first embodiment of a data center power supply architecture according to the present disclosure.

A method of some embodiments of the present invention will now be described with reference to first power distribution schematic 400 of FIG. 1. The first operation of the method is to determine a target power table that determines a target power for each grid to supply to the data center. The determination of the target power table involves three types of determinations: (i) determination of a total expected power draw constraint; (ii) determination of "sub-set power draw constraints;" and (iii) determination of the target distribution based on marginal power unit costs, where the target distribution meets the total power constraint and the subset power draw constraints. These three determinations, used to determine the power target table, will be discussed in the following paragraphs.

TOTAL POWER DRAW CONSTRAINT: First power distribution schematic 400 includes: power grids a, b and c; enclosures 4ac1 through 4ac5 (collectively referred to as enclosures 4ac—each of these enclosures is supplied by grids a and c); enclosures 4ab1 through 4ab3 (collectively referred to as enclosures 4ab—each of these enclosures is supplied by grids a and b); and enclosures 4bc1 and 4bc2 (collectively referred to as enclosures 4bc—each of these enclosures is supplied by grids b and c). In the example under discussion, the expected power requirements, on a load-by-load basis are as follows: (i) enclosure (data center load) 4ac requires 1500 w; (ii) enclosure (data center load) 4ab requires 2000 w; and enclosure (data center load) 4bc requires 2200 w. Accordingly, the data center, taken as a whole will require 5700 w (that is, the 4ac requirement plus the 4ab requirement plus the 4bc requirement). The total power draw constraint means that the target power table will be based in part upon a constraint that the aggregate power to be drawn from all grids is 5700 w. Generally speaking, the expected power draws are typically based on power draw patterns observed at some point(s) in the past. For example, the expected power requirements could be based on one, or more, of the following: (i) the amount of power being drawn by the data center loads at the time the pricing calculations are performed; (ii) an average power draw experienced over a previous time interval (for example, past hour, past day); and/or (iii) pre-scheduled operations to be performed by the enclosures.

SUB-SET EXPECTED POWER DRAW CONSTRAINTS: In addition to the expected total power requirement set forth in the previous paragraph, there are "sub-set requirements" that may be applicable in some embodiments. In the example under discussion, the sub-set expected power draw requirements are as follows: (i) the power drawn from grids a and c, in the aggregate, should be expected to be at least 1500 w (that is, the power from all data center loads that rely exclusively on grids a and c for power); (ii) the power drawn from grids a and b, in the aggregate, should be expected to be at least 2000 w (that is, the power from all data center loads that rely exclusively on grids a and b for power); and (iii) the power drawn from grids b and c, in the aggregate, should be expected to be at least 2200 w (that is, the power from all data center loads that rely exclusively on grids b and c for power). Alternatively, the constraints addressed in this paragraph could be addressed not when determining the target power draw table, but, rather, later in the process when power is being "offloaded" from deficit grids to surplus grids, as will be discussed below.

MARGINAL POWER UNIT COSTS: Many grids used in connection with the present invention will not have a single, constant cost per power unit (that is, cost per watt). Instead, the cost of power from the grid will be a function of the amount of power drawn so that drawing a larger amount of power will increase (or decrease) the power cost on a per unit (that is, per watt) basis. In this example, for the time interval and calendar date for which power distribution is being determined: (i) grid a provides moderately priced power (measured on a per watt basis) until power drawn goes above 500 w, at which point, the cost per watt increases substantially; (ii) grid b has a constant cost per power unit; and (iii) grid c provides very inexpensively priced power (measured on a per watt basis) until power drawn goes above 1500 w, at which point, the cost per watt increases substantially. The target power distribution is based on marginal power unit costs, but it should meet: (i) the total expected power draw constraint (explained two paragraphs above), and (ii) any sub-set expected power draw constraints (explained in the previous paragraphs). In this example, the distribution determined for the target draw table (that is, 2000 w for grid a, 3000 w for grid b, 700 w for grid c) occurs at a point where the per unit power draw for each of the three grids is approximately equal. Code and/or math for determining the target power distribution based on marginal power costs will be discussed later on.

A numeric illustration is now given, beginning with reference to the embodiment of first power distribution schematic 400 and the Power Target Table, below. This example "balances" power grids a, b and c with respect to supply of data center loads 4ab, 4ac and 4bc. For the following illustration, it is stipulated that during a given time period, a total power of 5700 w (watts) is the power expected to be required by enclosures 4ac, 4ab, and 4bc taken in the aggregate. A distribution algorithm (which is described in detail, further below) divides the total power supply among the three grids in an advantageous way, such that the total cost of power supplied during the given time period is reduced relative to what it would be under currently conventional power distribution schemes. Power Target Table shows the amount of power that will be supplied by each respective power grid (grids a, b, c) over a period of time that is about to begin (assuming that actual power requirements match expected power requirements and there are no grid failures):

Power Target Table

| Grid | Target Power Delivery (Watts) |
|---|---|
| A | 2000 |
| B | 3000 |
| C | 700 |
| Total | 5700 |

WEAK VERSUS STRONG OPTIMIZATION CONDITIONS: It is noted that there are many possible distributions so that the expected power requirements for each data center load of the data center, and the above power target table, are both met. Any power distribution that meets the expected power requirements for each data center load of the data center, and the power target table distribution based on costs, will be herein referred to as meeting "weak optimization conditions." Some embodiments of the present invention may meet only the weak optimization conditions, but will not meet the "strong optimization conditions." The strong optimization conditions typically determine a unique power distribution for each data center load. Determination of power distribution under strong optimization conditions will be discussed in the following paragraphs.

Enclosures and their respective power requirements are as follows:

Enclosures 4ac1 through 4ac5 receive power from grids a and c, and their power consumption values are: 100 w, 200 w, 300 w, 400 w, and 500 w, respectively.

Enclosures 4ab1 through 4ab3 receive power from grids a and b, and their power consumption values are: 600 w, 700 w, and 700 w, respectively.

Enclosures 4bc1 and 4bc2 receive power from grids b and c, and their power consumption values are 1000 w and 1200 w, respectively.

By default, the grids equally share in supplying power to their respective enclosures. For example, a first PSU connected to grid a, provides a first half of the total load consumed by enclosure 4ac1, and a second PSU, connected to grid c provides a second half of the load consumed by enclosure 4ac1. Given that the total load consumed by enclosure 4ac1 is 100 w, grids a and c each supply 50 w to enclosure 4ac1.

In the present illustration, the Initial Power Distribution Table, set forth below, gives the power supplied by grids a, b and c, and their respective power distributions among data center loads 4ab, 4ac and 4bc. Total power consumed by all enclosures is 5700 w and this load equals the total power supplied through power grids a, b, and c.

| Initial Power Distribution Table (All values in Watts) | | | | |
|---|---|---|---|---|
| Enclosure | Grid a | Grid b | Grid c | Total power |
| 4ac1 | 50 | | 50 | 100 |
| 4ac2 | 100 | | 100 | 200 |
| 4ac3 | 150 | | 150 | 300 |
| 4ac4 | 200 | | 200 | 400 |
| 4ac5 | 250 | | 250 | 500 |
| 4ab1 | 300 | 300 | | 600 |
| 4ab2 | 350 | 350 | | 700 |
| 4ab3 | 350 | 350 | | 700 |
| 4bc1 | | 500 | 500 | 1000 |
| 4bc2 | | 600 | 600 | 1200 |
| Total | 1750 | 2100 | 1850 | 5700 |

The Surplus/Deficit Table, set forth below, shows a deficit or surplus for each of grids a through c before power distribution is optimized. A deficit or surplus for a power grid is the difference between the default power level (that is, a power level based on an even split assumption for each data center load) and the target power level. That is, default power level minus target power level equals surplus or (deficit). If the difference is less than zero, the grid has a power deficit. If the difference is greater than zero, the grid has a power surplus. If the difference is equal to zero, the grid is balanced.

Surplus/Deficit Table
(All values in Watts)

| Grid | Default Power Level | Target Power Level | Surplus (Deficit) |
|---|---|---|---|
| A | 1750 | 2000 | (250) |
| B | 2100 | 3000 | (900) |
| C | 1850 | 700 | 1150 |
| Total | 5700 | 5700 | 0 |

The 1150 w surplus of grid c will be "offloaded" to grids a and b. To begin, a grid in deficit and a grid in surplus—in this example, grids b (deficit) and c (surplus) respectively—are selected. Enclosures 4bc receive power from grids b and c. Because the deficit of grid b is 900 w, only 900 w (of the 1150 w grid c surplus) will be offloaded from grid c to grid b.

In some embodiments of the present invention, this 900 w will be distributed between enclosures 4bc1 and 4bc2 in proportion to their individual power consumptions relative to their collective power consumption. That is, enclosure 4bc1 consumes 1000 w, enclosure 4bc2 consumes 1200 w, and their collective total is 2200 w. Their individual power consumption proportions are computed as follows:
4bc1: 1000/2200
4bc2: 1200/2200

900 w is to be distributed to enclosures 4bc according to the proportions calculated above. Therefore the power distribution is computed as follows:
4bc1: 900 w×1000/2200=409 w
4bc2: 900 w×1200/2200=491 w First Balancing Iteration Table 500 of FIG. 2, and in particular columns 504, 506, 514, 516, 524 and 526, shows the change in power distribution resulting from balancing of grid 4b of the present example. After 900 w is shifted from grid c to b: (i) grid b delivers its target power level of 2100 w+900 w=3000 w (refer to columns 504, 514, and 524 of Table 500); and (ii) grid c delivers 1850 w−900 w=950 w (refer to columns 506, 516, and 526).

Figure 2:
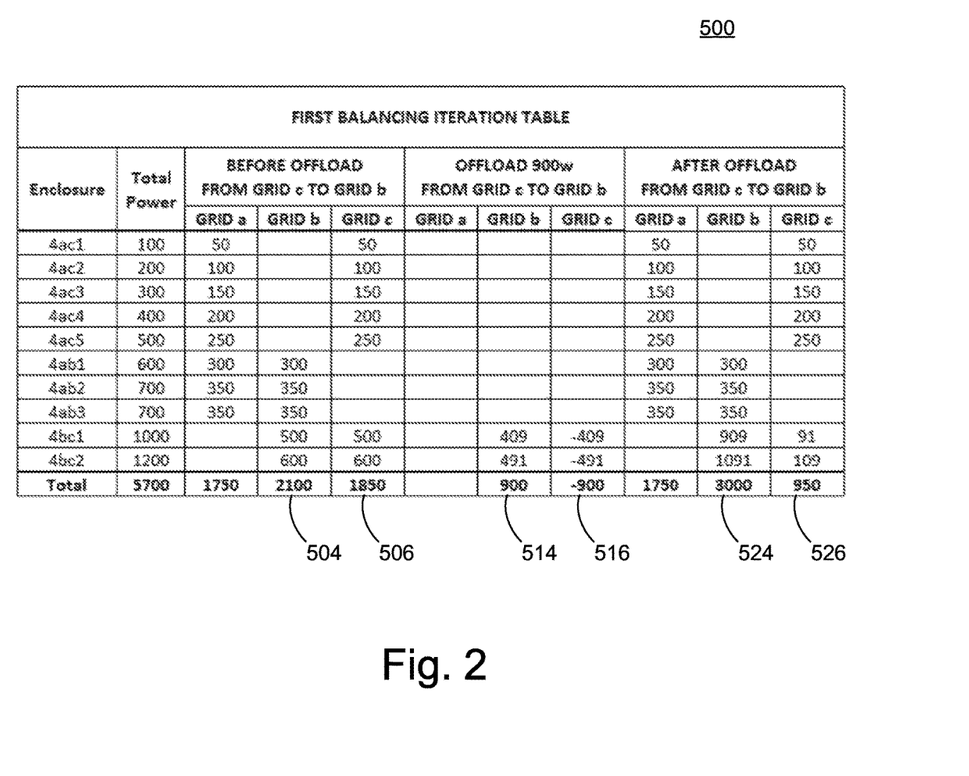
FIG. 2 is a table showing information that is helpful in understanding embodiments of the present invention.

With reference to the Power Target Table, set forth above, and table 500 of FIG. 2, it can be seen that 950 w currently supplied by grid c (column 526 of Table 500) represents a remaining surplus of grid c over its target of 700 w (see, the Power Target Table, above): 950 w (current) minus 700 w (target) equals 250 w surplus.

The example continues wherein a grid in deficit (that is, grid a) and a grid in surplus (that is, in this example, grid c) are selected. The process as illustrated above is repeated for grids a and c as follows. Grid a has a deficit of 250 w (see, Power Target Table, above) and grid c has a remaining surplus of 250 w. In some embodiments of the present invention, the surplus power is to be distributed among enclosures 4ac in proportion to their individual power consumptions relative to their collective power consumption. The individual power consumptions for enclosures 4ac1 through 4ac5 are 100 w, 200 w, 300 w, 400 w, and 500 w respectively. Their collective power consumption is 1500 w. Individual power consumption proportions are computed as follows:
4ac1: 100/1500
4ac2: 200/1500
4ac3: 300/1500
4ac4: 400/1500
4ac5: 500/1500

This means that 250 w is to be distributed to enclosures 4ac according to the proportions calculated above. Therefore the power distribution is computed as follows:
4ac1: 250 w×100/1500=17 w
4ac2: 250 w×200/1500=33 w
4ac3: 250 w×300/1500=50 w
4ac4: 250 w×400/1500=67 w
4ac5: 250 w×500/1500=83 w Second Balancing Iteration Table 600 of FIG. 3, and in particular columns 632, 636, 642, 646, 652, 654 and 656, shows the change in power distribution resulting from balancing grids a and c of the present example. After 250 w is shifted from grid c to grid a: (i) grid a delivers its target power level of 1750 w+250 w=2000 w (refer to columns 632, 642, and 652 of Table 5); and (ii) grid c delivers 950 w−250 w=700 w (refer to columns 636, 646, and 656 of Table 5).

Figure 3:
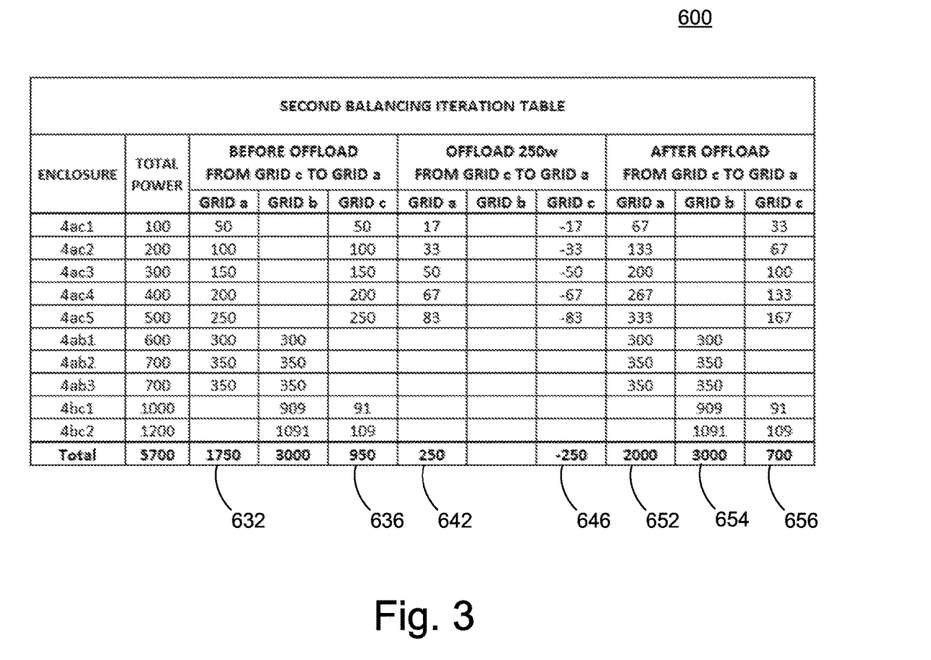
FIG. 3 is a table showing information that is helpful in understanding embodiments of the present invention.

With reference to Power Target Table, set forth above, and Table 600 of FIG. 3, it can be seen that grids a, b, and c now deliver their respective target power levels of 2000 w, 3000 w and 700 w (see columns 652, 654 and 656 of table 600).

Figure 4:
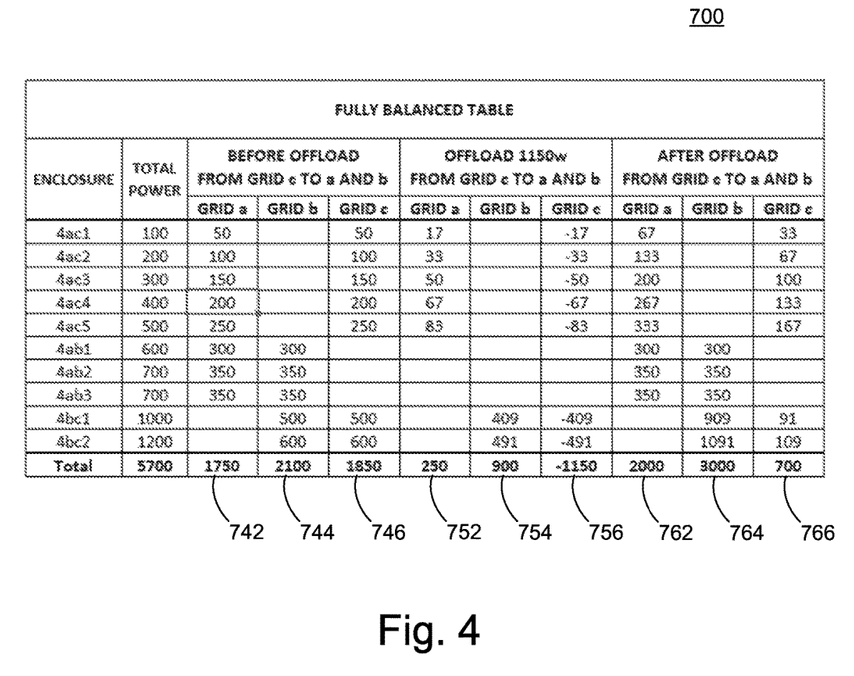
FIG. 4 is a table showing information that is helpful in understanding embodiments of the present invention.

Fully Balanced Table 700 of FIG. 4, shows a summary of the completed foregoing load balancing example. Columns 742, 744 and 746 show the initial power distribution of grids a, b and c respectively. Columns 752, 754 and 756 show the shift of power, among grids 4a, 4b and 4c, respectively, that took place during the load balancing. Columns 762, 764, and 766 show the resulting power distribution from all grids and across all enclosures after completion of the load balancing.

Figure 5:
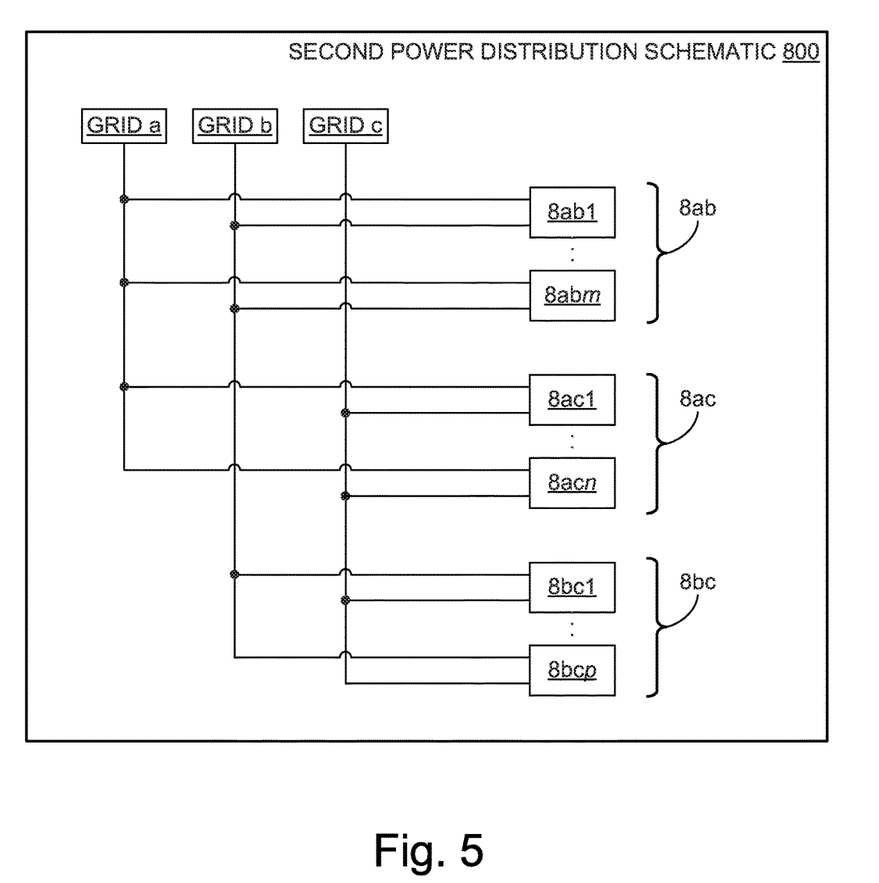
FIG. 5 is a schematic view of a second embodiment of a data center power supply architecture according to the present disclosure.

The distribution algorithm referred to above will now be generalized, and described in detail, over the course of the following paragraphs, with reference to second power distribution schematic 800 of FIG. 5. Second power distribution schematic 800 includes: enclosures 8ab1 through 8abm, collectively enclosures 8ab; enclosures 8ac1 through 8acn, collectively enclosures 8ac; enclosures 8bc1 through 8bcp, collectively enclosures 8bc; and power grids a, b, and c.

Problem statement: Given a plurality of enclosures connected to three grids, a, b, and c, wherein each enclosure is connected to two different grids, and each grid provides power at a certain cost which depends on the time of the day (and night), find power delivery of each enclosure/grid combination such that the total cost of power along a 24 hour day is minimum.

The following parameters are designated as follows: (i) GridA is grid a of power supply schematic 800; (ii) GridB is grid b of power supply schematic 800; (iii) GridC is grid c of power supply schematic 800; (iv) T equals an arbitrary time period, of arbitrary duration; (v) W equals total power required at time T; (vi) WdA equals desired power provided by GridA; (vii) WdB equals desired power provided by GridB; (viii) WdC equals desired power provided by grid C; (ix) ΔW equals a power increment to define the granularity of algorithms given below; (x) GridA_load equals power supplied by grid A at time T; (xi) GridB_load equals power supplied by grid B at time T; (xii) GridC_load equals power supplied by GridC at time T; (xiii) ΔA equals surplus (+) or deficit (−) of GridA; (xiv) ΔB equals surplus (+) or deficit (−) of GridB; and (xv) ΔC equals surplus (+) or deficit (−) of GridC.

Main Algorithm:
FOR EVERY TIME T OF THE DAY DO
    FindOptimalLoadForGrids(W, GridA_load, GridB_load, GridC_load)
    SET THE POWER LOADS ON EACH OF THE DUAL PSUs OF EVERY ENCLOSURE
END The function FindOptimalLoadForGrids ( ) finds the optimal load for each grid by stepping through the power load in steps of ΔW and allocating the cheapest power source for each ΔW. An algorithm for FindOptimalLoad-ForGrids ( ) follows:
FindOptimalLoadForGrids(W, WdA, WdB, WdC)
Initialize WdA, WdB, WdC
For 0 to W, in steps of ΔW DO
  If min(GetPrice(GridA, ΔW), GetPrice(GridB, ΔW), GetPrice(GridC, ΔW))=GetPrice(GridA, WdA, ΔW, T) THEN
    WdA=WdA+ΔW
  If min(GetPrice(GridA, ΔW), GetPrice(GridB, ΔW), GetPrice(GridC, ΔW))=GetPrice(GridB, WdB, ΔW, T) THEN
    WdB=WdB+ΔW
  If min(GetPrice(GridA, ΔW), GetPrice(GridB, ΔW), GetPrice(GridC, ΔW))=GetPrice(GridC, WdC, ΔW, T) THEN
    WdC=WdC+ΔW
END In general, the function GetPrice (GridX, WdX, ΔW, T) returns the price of GridX providing power of ΔW in addition to the already allocated power for GridX WdX at time T.

Next, the power loads supplied by each of the dual PSUs for each enclosure are determined. Relevant nomenclature will be defined in the following paragraphs.

Enclosures ABi, shown in second power distribution schematic 800 of FIG. 5 as enclosures Bab, denote enclosures connected to grids a and b. Total number of such enclosures is m.

Enclosures ACj, shown in second power distribution schematic 800 as enclosures 8ac, denote enclosures connected to grids a and c. Total number of such enclosures is n.

Enclosures BCk, shown in second power distribution schematic 800 as enclosures 8bc, denote enclosures connected to grids b and c. Total number of such enclosures is p.

WX(XYz)=Power of GridX connected to enclosure XYz, where X and Y can be A, B, or C.
WX(XY)=Power of GridX connected to all enclosures XY, where X and Y can be A, B, or C.
WX=Total power of GridX (all connected enclosures).
W=Total system power (all three grids combined).
ΔX=Surplus (+) or deficit (−) of GridX, compared with WdX.
WXY=Total power of enclosures XY.
W(XYz)=Power of enclosure Xyz.
WdA, WdB, WdC are the desired loads on grids A, B, and C, respectively, and were computed above in FindOptimal-LoadsFor_Grid_A_B_and_C( ).

The steps of the algorithm will be respectively set forth in the following paragraphs.

Step 0: Measure the total power consumption of each enclosure of the system.

Step 1: For each enclosure, split the power equally between the two grids that supply power to the enclosure.

Step 2: Sum up the power of grids A, B, and C using the following equations:

$$WA=WA(AB)+WA(AC)$$

$$WB=WB(AB)+WB(BC)$$

$$WC=WC(AC)+WC(BC)$$

Step 3: Sum up the power on all enclosures using the following equation:

$$W=WA+WB+WC$$

Step 4: Compute the deficit or surplus per grid using the following equations:

$$\Delta A=WA-WdA$$

$$\Delta B=WB-WdB$$

$$\Delta C=WC-WdC$$

Step 5: Pick one grid with a surplus and one grid with a deficit. Without loss of generality, and for illustrative purpose only, GridA is stipulated as being in deficit and grid B as being in surplus.

Step 6: Sum all power of enclosures ABi, where i=1 through m. The sum is denoted as WAB.

Step 7: Pick the smaller of absolute values of ΔA and ΔB. Without loss of generality, and for illustrative purpose only, it is stipulated that the absolute value of ΔA is less than that of ΔB. The absolute value of ΔA is denoted as |ΔA|.

Step 8: Divide the surplus for each enclosure ABi proportionally among all enclosures AB. Increase power contributed by the grid in deficit (GridA), and decrease power contributed by the grid in surplus (GridB) according to the following sub-algorithm:
FOR every Enclosure ABi DO $$WA(ABi)=WA(ABi)+(|\Delta A|\times W(ABi)/WAB)$$

Set the power level of PSU connected to GridA of ABi to WA(ABi)

$$WB(ABi)=WB(ABi)-(|\Delta A|\times W(ABi)/WAB)$$

Set the power level of PSU connected to GridB of ABi to WB(ABi)
END

Step 9: Update total power of GridA and GridB according to the following equations:

$$WA=WA(AB)+WA(AC)$$

$$WB=WB(AB)+WB(BC)$$

Step 10: Update deficit and surplus of GridA and GridB. ΔA should be essentially 0.

$$\Delta A=WA-Wd$$

$$\Delta B=WB-Wd$$

Step 11: Repeat steps 5 through 10 of the algorithm, making the appropriate letter substitutions.

Some embodiments of the present invention may include one, or more, of the following features, characteristics and/or advantages: (i) finely balances power according to desired values that are determined by cost optimization on a periodic (for example, hourly) basis; and/or (ii) balances between power sources at the enclosure level, without the need for switching between power sources.

OTHER DETERMINISTIC WAYS FOR DETERMINING GRID DISTRIBUTION: A deterministic method for determining grid distribution (for multiple data center loads and data centers with access to at least three grids) has been discussed above in detail, and denominated herein as methods meeting "strong optimizing conditions." However, it should be understood that there are other deterministic ways for choosing a specific grid distribution from among the many possible grid distributions that meet the weak optimizing conditions, as discussed above. For example, one alternative way to reach a determinative grid distribution scheme is to: (i) determine a representative sub-set of grid distribution schemes that meet the weak optimizing conditions; (ii) determine expected costs respectively associated with each grid distribution scheme of the representative sub-set; (iii) choose the lowest expected cost grid distribution; and (iv) adjust the PSHSs of the data center to implement the chosen grid distribution.

Some embodiments of the present invention may include one, or more, of the following characteristics, features and/or advantages: (i) systems and method to balance multiple power grids that feed a set of data center loads; (ii) the system may include all enclosures installed on a single physical rack in the data center, but it may also comprise enclosures residing in separate racks, but still fed by the same power grid; (iii) a system and method for continuously balancing multiple power grids connected to a set of redundant-power-supplied data center loads wherein the system is based on proportional division of the surplus of one grid among all relevant enclosures and moving the individual surplus amounts to a grid in deficit; (iv) the surplus for each enclosure is proportionally divided on all enclosures, added to the grid in deficit and subtracted from the one in surplus; and/or (v) the total power of the grids is then updated and the updated deficit and surplus of grids A and B computes to zero, resulting in balance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some definitions for use in conjunction with this document will be set forth in the following paragraphs.

Power supply hardware set: any set of hardware that can receive electrical power from a set of different grid sources, and can supply that electrical power to a load in a data center (for example, an enclosure) such that the proportion of power, to the load and from each grid source, can be controlled (with some level of granularity of control) by hardware of the power supply hardware set; in some embodiments, the power supply hardware set will be a set of power supply units, where each power supply unit controls power from one grid source.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A computer-implemented method comprising:
   receiving a plurality of cost information data sets, with each cost information data set respectively corresponding to a power grid of a plurality of power grids, including at least three power grids, and including expected cost information for electrical power drawn from the corresponding power grid during a time period;
   receiving a plurality of usage information data sets, with each usage information data set respectively corresponding to a data center load of a plurality of data center loads in a data center and including expected usage information for electrical power expected to be drawn by a corresponding data center load during the time period;
   determining a target power information set, based, at least in part, on the plurality of cost information data sets and the plurality of usage information data sets, with the target power information set, for the time period, including a target power amount respectively corresponding to each power grid;
   determining a power supply unit configuration scheme so that, when operating under the power supply unit configuration scheme, each power grid of the plurality of power grids will supply, at least approximately, its respectively corresponding target power amount, with the determination of the power supply unit configuration scheme including:
      determining a default configuration scheme where each power supply unit of each plurality of dedicated power supply units would supply power to its respectively corresponding data center load in equal measure,
      determining how much power each power grid would supply under the default configuration scheme,
      determining a set of surplus power grid(s) that would supply more power under the default configuration scheme than the respectively corresponding target power amount for that power grid,
      determining a set of deficit power grid(s) that would supply less power under the default configuration scheme than the respectively corresponding target power amount for each deficit power grid of the set of deficit power grid(s), and
      offloading power from the set of surplus power grid(s) to the set of deficit grid(s) until each power grid of the plurality of power grids supplies, at least approximately, its respectively corresponding target power amount; and
   applying the power supply unit configuration scheme to a plurality of power supply units, with the plurality of power supply units being structured, connected and/or programmed to control the flow of electrical power from the plurality of power grids to the plurality of data center loads.

2. The computer-implemented method of claim 1 wherein the plurality of power supply units are connected to the plurality of power grids and the plurality of data center loads such that each data center load is supplied by a plurality of dedicated power supply units where each power supply unit of the plurality of dedicated power supply units supplies power from a different power grid.

3. The computer-implemented method of claim 1 wherein at least a first cost information data set of the plurality of cost information data sets includes expected cost information for a corresponding first power grid that varies on a per power unit basis with respect to the amount of power drawn from the first power grid.

4. The computer-implemented method of claim 3 wherein the determination of a target power information data set is further based, at least in part, upon current and/or past observed power usage for the plurality of data center loads.

5. The computer-implemented method of claim 1 further comprising:

generating the plurality of usage information data sets based, at least in part, upon observed power usage, with each usage information data set respectively corresponding to data center load in a data center and including expected usage information for electrical power expected to be drawn by the corresponding data center load during the time period.

6. A computer program product comprising a non-transitory computer readable storage medium having stored thereon:

first program instructions programmed to receive a plurality of cost information data sets, with each cost information data set respectively corresponding to a power grid of a plurality of power grids, including at least three power grids, and including expected cost information for electrical power drawn from the corresponding power grid during a time period;

second program instructions programmed to receive a plurality of usage information data sets, with each usage information data set respectively corresponding to a data center load of a plurality of data center loads in a data center and including expected usage information for electrical power expected to be drawn by the corresponding data center load during the time period;

third program instructions programmed to determine a target power information set, based, at least in part, on the plurality of cost information data sets and the plurality of usage information data sets, with the target power information set, for the time period, including a target power amount respectively corresponding to each power grid; and fourth program instructions programmed to determine a power supply unit configuration scheme so that, when operating under the power supply unit configuration scheme, each power grid of the plurality of power grids will supply, at least approximately, its respectively corresponding target power amount, with the determination of the power supply unit configuration scheme including:

fifth program instructions programmed to determine a default configuration scheme where each power supply unit of each plurality of dedicated power supply units would supply power to its respectively corresponding data center load in equal measure, sixth program instructions programmed to determine how much power each power grid would supply under the default configuration scheme, seventh program instructions programmed to determine a set of surplus power grid(s) that would supply more power under the default configuration scheme than the respectively corresponding target power amount for that power grid, eight program instructions programmed to determine a set of deficit power grid(s) that would supply less power under the default configuration scheme than the respectively corresponding target power amount for each deficit power grid of the set of deficit power grid(s), and ninth program instructions programmed to offload power from the set of surplus power grid(s) to the set of deficit grid(s) until each power grid of the plurality of power grids supplies, at least approximately, its respectively corresponding target power amount; and tenth program instructions programmed to apply the power supply unit configuration scheme to a plurality of power supply units, with the plurality of power supply units being structured, connected and/or programmed to control the flow of electrical power from the plurality of power grids to the plurality of data center loads.

7. The computer program product of claim 6 wherein the plurality of power supply units are connected to the plurality of power grids and the plurality of data center loads such that each data center load is supplied by a plurality of dedicated power supply units where each power supply unit of the plurality of dedicated power supply units supplies power from a different power grid.

8. The computer program product of claim 6 wherein at least a first cost information data set of the plurality of cost information data sets includes expected cost information for a corresponding first power grid that varies on a per power unit basis with respect to the amount of power drawn from the first power grid.

9. The computer program product of claim 8 wherein the determination of a target power information data set is further based, at least in part, upon current and/or past observed power usage for the plurality of data center loads.

10. The computer program product of claim 6 further comprising:

A set of processor(s) structured and/or connected to perform the program instructions stored on the computer readable storage medium.

* * * * *